United States Patent
Uriu et al.

(10) Patent No.: US 10,669,198 B2
(45) Date of Patent: Jun. 2, 2020

(54) VACUUM GLASS PANEL, GLASS WINDOW, AND METHOD FOR PRODUCING VACUUM GLASS PANEL

(71) Applicant: PANASONIC INTELLECTUAL PROPERTY MANAGEMENT CO., LTD., Osaka (JP)

(72) Inventors: Eiichi Uriu, Osaka (JP); Tasuku Ishibashi, Osaka (JP); Hiroyuki Abe, Osaka (JP); Masataka Nonaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 117 days.

(21) Appl. No.: 15/755,456

(22) PCT Filed: Sep. 1, 2016

(86) PCT No.: PCT/JP2016/003993
§ 371 (c)(1),
(2) Date: Feb. 26, 2018

(87) PCT Pub. No.: WO2017/043054
PCT Pub. Date: Mar. 16, 2017

(65) Prior Publication Data
US 2018/0244571 A1    Aug. 30, 2018

(30) Foreign Application Priority Data

Sep. 7, 2015  (JP) ................. 2015-176185

(51) Int. Cl.
*E06B 3/673*   (2006.01)
*C03C 27/10*   (2006.01)
(Continued)

(52) U.S. Cl.
CPC .............. *C03C 27/10* (2013.01); *C03C 27/06* (2013.01); *E06B 3/663* (2013.01); *E06B 3/6612* (2013.01);
(Continued)

(58) Field of Classification Search
CPC ...... E06B 3/673; E06B 3/677; E06B 3/67334; E06B 3/36775; E06B 3/6775
See application file for complete search history.

(56) References Cited

U.S. PATENT DOCUMENTS 6,365,242 B1 *  4/2002  Veerasamy ........... E06B 3/6612
                                                                        428/34
6,436,493 B1    8/2002  Asano et al.
(Continued)

FOREIGN PATENT DOCUMENTS

| CN | 1277596 A | 12/2000 |
|----|-----------|---------|
| CN | 1240925 C | 2/2006  |

(Continued)

OTHER PUBLICATIONS

International Search Report and Written Opinion issued in International Patent Application No. PCT/JP2016/003993, dated Oct. 18, 2016; with partial English translation.

(Continued)

*Primary Examiner* — Donald J Loney
(74) *Attorney, Agent, or Firm* — McDermott Will & Emery LLP

(57) ABSTRACT

A vacuum glass panel includes a first glass plate, a second glass plate facing the first glass plate, a frame member having a frame shape and bonding the first glass plate to the second glass plate, and a heat reflective film disposed on an inner surface of the first glass plate. A vacuum space is provided between the first glass plate and the second glass plate. The heat reflective film separates the first glass plate (Continued)

from the vacuum space without a gap. The frame member is in contact with the first glass plate.

5 Claims, 8 Drawing Sheets

(51) Int. Cl.
    *E06B 3/66*     (2006.01)
    *E06B 3/663*     (2006.01)
    *C03C 27/06*     (2006.01)
    *E06B 3/67*     (2006.01)
    *E06B 3/677*     (2006.01)

(52) U.S. Cl.
    CPC ............ *E06B 3/66304* (2013.01); *E06B 3/67* (2013.01); *E06B 3/6715* (2013.01); *E06B 3/6775* (2013.01); *E06B 3/67334* (2013.01); *E06B 3/673* (2013.01); *E06B 3/677* (2013.01); *Y02A 30/25* (2018.01); *Y02B 80/24* (2013.01)

(56) References Cited

U.S. PATENT DOCUMENTS

| | | |
|---|---|---|
| 6,830,791 B1 | 12/2004 | Misonou et al. |
| 2015/0068665 A1 | 3/2015 | Abe et al. |

FOREIGN PATENT DOCUMENTS

| | | |
|---|---|---|
| CN | 104302592 A | 1/2015 |
| JP | 55-144454 A | 11/1980 |
| JP | 2000-086305 A | 3/2000 |
| JP | 2000-087656 A | 3/2000 |
| JP | 2004-149354 A | 5/2004 |
| JP | 2005-187305 A | 7/2005 |
| JP | 2012-036019 A | 2/2012 |
| JP | 2012-206920 A | 10/2012 |
| JP | 2013-227181 A | 11/2013 |
| JP | 2014-133675 A | 7/2014 |
| KR | 10-2011-0083247 A | 7/2011 |
| WO | 2004/039743 A1 | 5/2004 |
| WO | 2009/039240 A2 | 3/2009 |
| WO | 2012/018000 A1 | 2/2012 |
| WO | 2013/172034 A1 | 11/2013 |

OTHER PUBLICATIONS

Extended European Search Report issued in European Application No. 16843922.2 dated Jun. 5, 2018.

\* cited by examiner

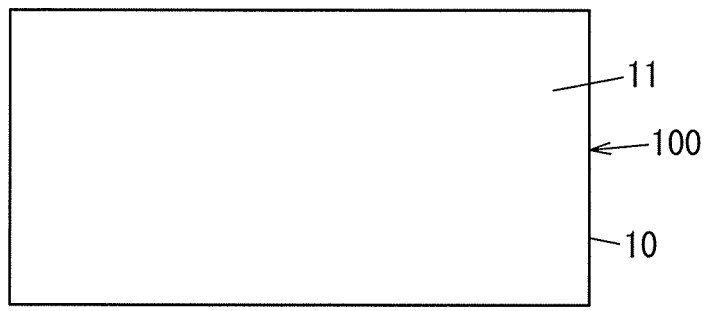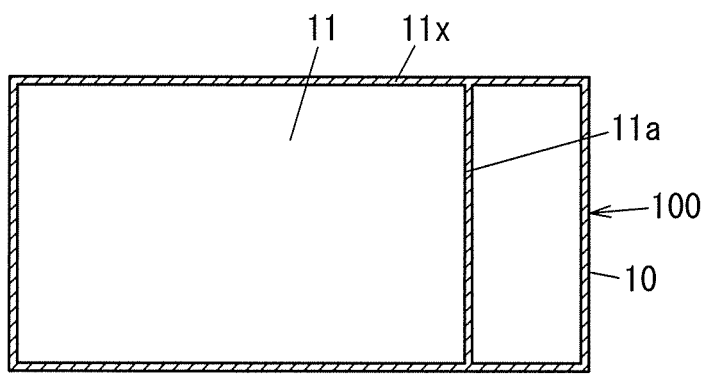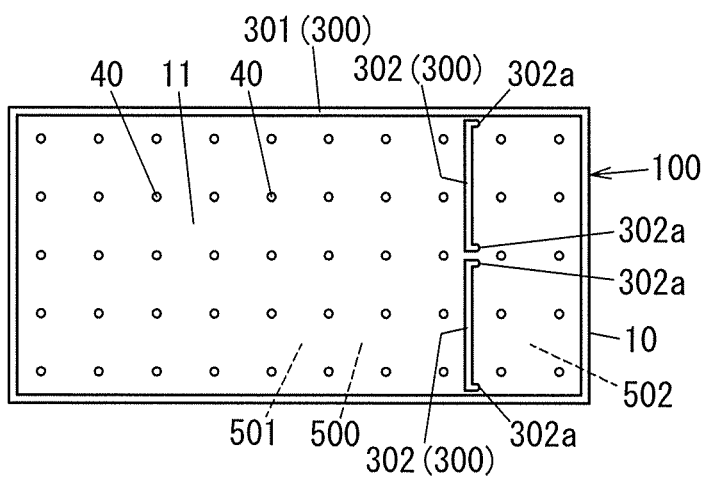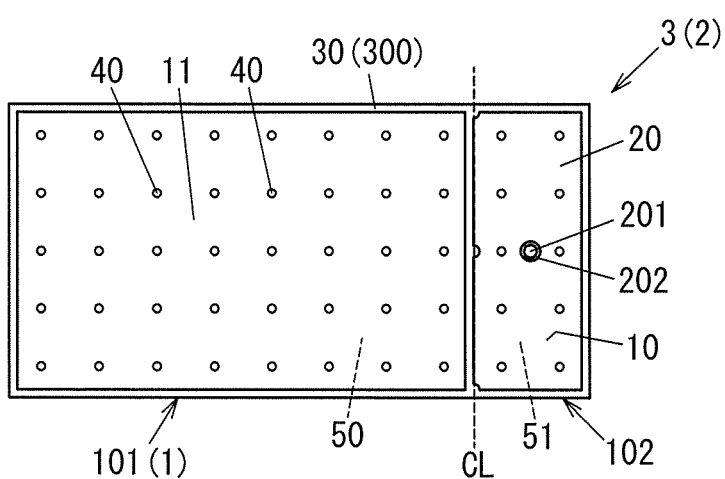

VACUUM GLASS PANEL, GLASS WINDOW, AND METHOD FOR PRODUCING VACUUM GLASS PANEL

RELATED APPLICATIONS

This application is the U.S. National Phase under 35 U.S.C. § 371 of International Patent Application No. PCT/JP2016/003993, filed on Sep. 1, 2016, which in turn claims the benefit of Japanese Application No. 2015-176185, filed on Sep. 7, 2015, the entire disclosures of which applications are incorporated by reference herein.

TECHNICAL FIELD

The present invention relates to a vacuum glass panel, a glass window, and a method for producing the vacuum glass panel.

BACKGROUND ART

A known vacuum glass panel includes a pair of glass plates with a vacuum space between the pair of glass plates. The vacuum glass panel is also referred to as a sealed insulating glass. In the vacuum glass panel, the vacuum space reduces thermal conduction, and therefore, the vacuum glass panel has an excellent thermal insulation property. In producing the vacuum glass panel, two glass plates which are paired are bonded to each other with a gap therebetween to form an inner space, gas in the inner space is exhausted, and the inner space is hermetically sealed, thereby forming the vacuum space.

In the vacuum glass panel, the two glass plates are bonded to each other by an adhesive material different from the glass plates, which may reduce the adhesive strength of a bonded portion of the glass plates. A reduction in adhesive strength may lead to problems such as breakage of the vacuum glass panel and deterioration of the thermal insulation property due to entrance of air into the vacuum space. Thus, it is important to increase the adhesive strength of the bonded portion of the glass plates. In particular, a vacuum glass panel including a heat reflective film provided on an inner surface of at least one of glass plates of the vacuum glass panel further requires an increased adhesive strength of the glass plates while maintaining a thermal insulation property obtained by the heat reflective film and a vacuum.

Patent Literature 1 discloses a sealed insulating glass including a pair of glass plates and a low-emissivity (LOW-E) film formed on a surface of one of the pair of glass plates, wherein the glass plates are bonded to each other at a portion on which the LOW-E film is not provided. However, a space between the pair of glass plates is not a vacuum, and therefore, the sealed insulating glass panel does not have a high thermal insulation property.

CITATION LIST

Patent Literature

Patent Literature 1: JP 2005-187305 A

SUMMARY OF INVENTION

It is an object of the present invention to provide a vacuum glass panel having a high adhesive strength at a bonded portion of glass plates of the vacuum glass panel and having a high thermal insulation property, and a method for producing the vacuum glass panel.

A vacuum glass panel, a glass window, and a method for producing the vacuum glass panel of the present invention are as follows.

The vacuum glass panel includes: a first glass plate; a second glass plate facing the first glass plate; a frame member having a frame shape and bonding the first glass plate to the second glass plate; and a heat reflective film disposed on an inner surface of the first glass plate. A vacuum space is provided between the first glass plate and the second glass plate. The heat reflective film separates the first glass plate from the vacuum space without a gap. The frame member is in contact with the first glass plate.

The glass window includes the vacuum glass panel and a window frame fitted to a peripheral portion of the vacuum glass panel.

The method for producing the vacuum glass panel includes: removing, from a first glass body including a first glass plate and a heat reflective film disposed on a first surface of the first glass plate, part of the heat reflective film to form a portion having a frame shape without the heat reflective film; disposing a glass adhesive in the portion having the frame shape and formed in the first glass body by removing the heat reflective film; disposing a second glass body including a second glass plate to face the first glass body; evacuating a space between the first glass body and the second glass body; and bonding the first glass body and the second glass body with the glass adhesive in a frame shape.

BRIEF DESCRIPTION OF DRAWINGS

FIG. 4A is a plan view illustrating the step in the example method for producing the vacuum glass panel, FIG. 4B is a plan view illustrating a step following the step of FIG. 4A, FIG. 4C is a plan view illustrating a step following the step of FIG. 4B, and FIG. 4D is a plan view illustrating a step following the step of FIG. 4C;

DESCRIPTION OF EMBODIMENTS

A vacuum glass panel of a first embodiment and a method for producing the vacuum glass panel will be described below.

Figure 1A:
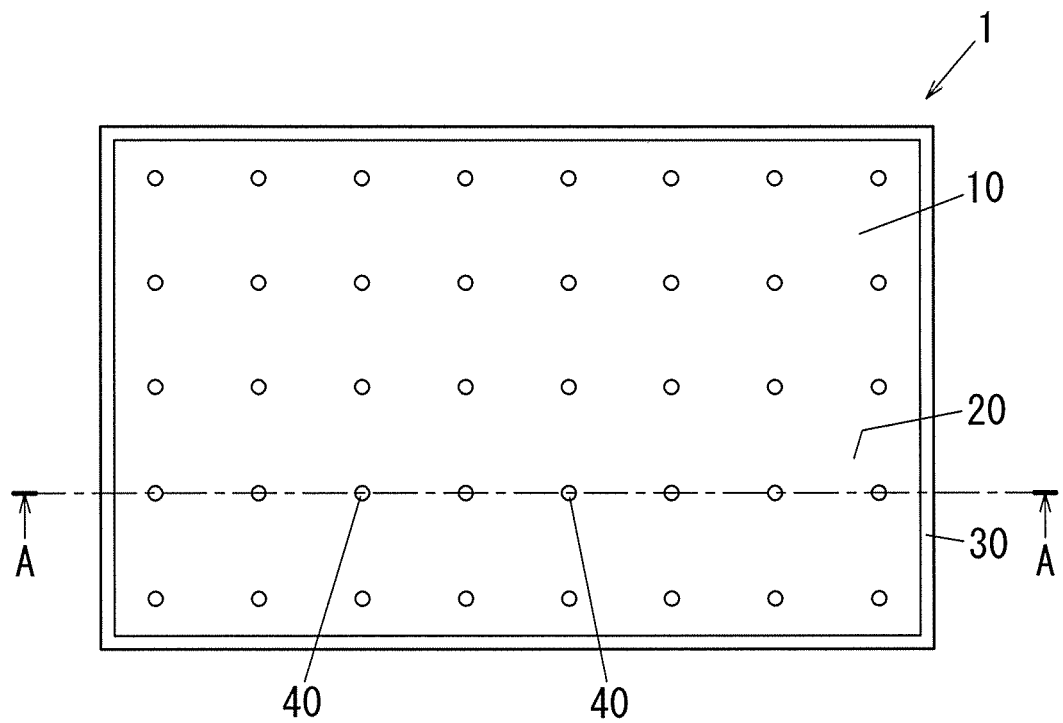
FIG. 1A is a plan view illustrating a vacuum glass panel of a first embodiment.
Figure 1B:
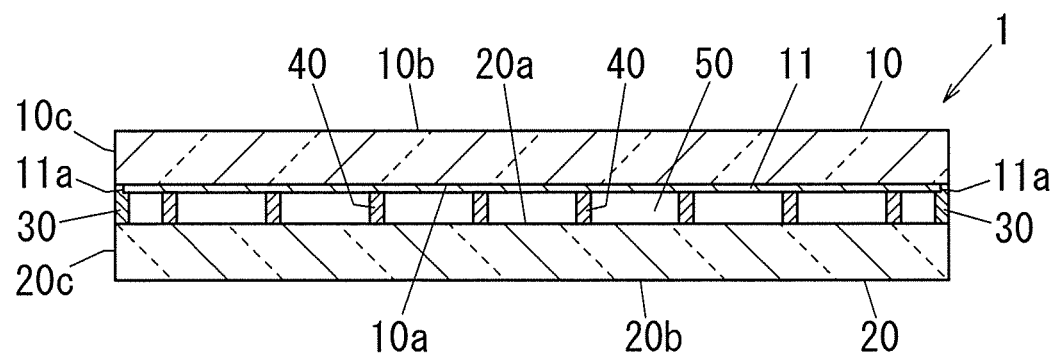
FIG. 1B is a sectional view taken along line A-A of FIG. 1A.

FIGS. 1A and 1B schematically illustrate a vacuum glass panel 1 of the first embodiment. The actual dimension of each of components of the vacuum glass panel 1 may be different from those shown in FIGS. 1A and 1B. In particular, in FIG. 1B, the thickness of the vacuum glass panel 1 is illustrated larger than its actual thickness so as to facilitate understanding.

The vacuum glass panel 1 is substantially transparent. Thus, members (e.g., a frame member 30 and spacers 40) in the vacuum glass panel 1 are visible. In FIG. 1A, the members which are in the vacuum glass panel and which are visible are illustrated. In FIG. 1A, the vacuum glass panel 1 is viewed from a side on which a first glass plate 10 is provided.

The vacuum glass panel 1 includes the first glass plate 10, a second glass plate 20 facing the first glass plate 10, and a frame member 30 entirely bonding a frame-shaped peripheral portion of the first glass plate 10 to a frame-shaped peripheral portion of the second glass plate 20. The vacuum glass panel 1 has a vacuum space 50. The vacuum space 50 is provided between the first glass plate 10 and the second glass plate 20. The vacuum glass panel 1 includes a heat reflective film 11. The heat reflective film 11 is disposed on an inner surface (a surface facing the second glass plate 20) of the first glass plate 10. The heat reflective film 11 separates the first glass plate 10 from the vacuum space 50 without a gap (i.e., completely separates the first glass plate 10 from the vacuum space 50). The frame member 30 is in contact with the first glass plate 10. Since the vacuum glass panel 1 includes the vacuum space 50 and the heat reflective film 11, heat is less likely to be transmitted in a thickness direction of the vacuum glass panel 1. Thus, the vacuum glass panel 1 has a high thermal insulation property. Moreover, in the vacuum glass panel 1, the frame member 30 is directly in contact with the first glass plate 10, which enhances the adhesiveness between the frame member 30 and the first glass plate 10. Thus, the vacuum glass panel 1 has a high adhesive strength at a bonding portion (an edge of the vacuum glass panel 1) of the glass plates.

The vacuum glass panel 1 includes the plurality of spacers 40. The plurality of spacers 40 secure the distance between the first glass plate 10 (the heat reflective film 11) and the second glass plate 20, so that the vacuum space 50 is easily and stably formed.

The inner surface of the first glass plate 10 is defined as a first surface 10a, and an outer surface of the first glass plate 10 is defined as a second surface 10b. An inner surface of the second glass plate 20 is defined as a first surface 20a, and an outer surface of the second glass plate 20 is defined as a second surface 20b. The first surface 10a of the first glass plate 10 faces the first surface 20a of the second glass plate 20.

When the vacuum glass panel 1 is applied to, for example, a building, the first glass plate 10 is disposed outdoors, and the second glass plate 20 is disposed indoors. In contrast, the first glass plate 10 may be disposed indoors, and the second glass plate 20 may be disposed in outdoors. The vacuum glass panel 1 is applicable to, for example, windows, partitions, and signage panels.

The first glass plate 10 and the second glass plate 20 each have a thickness, for example, within a range from 1 mm to 10 mm. In the present embodiment, the thickness of the first glass plate 10 is equal to the thickness of the second glass plate 20. When the thickness of the first glass plate 10 is equal to the thickness of the second glass plate 20, the same glass plates can be used as the first glass plate 10 and the second glass plate 20, and therefore, the production of the vacuum glass panel is facilitated.

As illustrated in FIG. 1A, the first glass plate 10 and the second glass plate 20 each have a rectangular shape. The vacuum glass panel 1 has a rectangular shape. An outer edge of the first glass plate 10 is aligned with an outer edge of the second glass plate 20 in plan view. The term "plan view" means that the vacuum glass panel 1 is viewed along the thickness direction of the vacuum glass panel 1.

Examples of materials of the first glass plate 10 and the second glass plate 20 include soda-lime glass, high strain point glass, chemically strengthened glass, no-alkali glass, quartz glass, Neoceram, and physically strengthened glass.

The vacuum space 50 is hermetically sealed with the first glass plate 10, the second glass plate 20, and the frame member 30. The frame member 30 functions as a sealer. The degree of vacuum of the vacuum space 50 is lower than or equal to a prescribed value. The prescribed value of the degree of vacuum is, for example, 0.01 Pa. The vacuum space 50 is formed by evacuation. The dimension of the vacuum space 50 in its thickness direction is, for example, 10 μm to 1000 μm.

The vacuum glass panel 1 may include gas adsorbent in the vacuum space 50. The gas adsorbent may be referred to as getter. Since the gas adsorbent adsorbs gas in the vacuum space 50, the degree of vacuum of the vacuum space 50 is maintained, and the thermal insulation property is improved. The gas adsorbent is disposed at least, for example, on the inner surface of the first glass plate 10, the inner surface of the second glass plate 20, a side part of the frame member 30, or in the spacers 40.

The frame member 30 is made from a glass adhesive. The glass adhesive contains heat-melting glass. The hot-melt glass is also referred to as low melting glass. The glass adhesive is, for example, glass frit including heat-melting glass. The glass frit is, for example, bismuth-based glass frit, lead-based glass frit, or vanadium-based glass frit.

The frame member 30 is disposed at the edge of the vacuum glass panel 1. The frame member 30 is in contact with the first glass plate 10 and the second glass plate 20. Since the frame member 30 is in contact with both the first glass plate 10 and the second glass plate 20, a bonding portion of the glass plates, that is, the edge of the vacuum glass panel 1 which is a glass joint part has an increased adhesive strength. The frame member 30 is in contact with the inner surface (the first surface 10a) of the first glass plate 10. The frame member 30 is in contact with the inner surface (the first surface 20a) of the second glass plate 20.

The spacers 40 are disposed in the vacuum space 50. The spacers 40 are disposed between the first glass plate 10 (the heat reflective film 11) and the second glass plate 20. The spacers 40 are in contact with the heat reflective film 11 disposed on the first glass plate 10. The spacers 40 are in contact with the second glass plate 20.

In the present embodiment, each spacer 40 has a columnar shape. Each spacer 40 has a diameter of, for example, 0.1 mm to 10 mm. Each spacer 40 may have a prism shape. The spacers 40 are preferably light transmissive. Thus, the spacers 40 are less visible.

The heat reflective film 11 is disposed on the inner surface (the first surface 10a) of the first glass plate 10. The heat reflective film 11 includes, for example, an infrared reflective film. Since the infrared reflective film can block infrared rays, the thermal insulation property of the vacuum glass panel 1 is improved. The heat reflective film 11 may be a Low-E film. The heat reflective film 11 may have a thermal barrier property. The heat reflective film 11 may be made from, for example, a metal thin film. Note that since the metal thin film has a small thickness and is light transmissive, the heat reflective film 11 has almost no influence on the transparency of the vacuum glass panel 1.

The heat reflective film 11 completely separates the vacuum space 50 from the first glass plate 10. Between the first glass plate 10 and the vacuum space 50, the heat reflective film 11 is located without a gap. Between the first glass plate 10 and the vacuum space 50, there is no area where the heat reflective film 11 is not provided. The heat reflective film 11 is disposed on substantially the entirety of the first surface 10a of the first glass plate 10. Note that the heat reflective film 11 is not provided in a part of the edge of the vacuum glass panel 1, that is, in a part of the portion where the frame member 30 is provided.

The heat reflective film 11 is preferably at least provided in the entire area of the first glass plate 10 surrounded by the frame member 30.

In a preferable example of the present embodiment, the heat reflective film 11 is slightly larger than the entire area surrounded by the frame member 30. The heat reflective film 11 has an edge 11a extending in the frame member 30. The edge 11a of the heat reflective film 11 is disposed between the first glass plate 10 and the frame member 30.

Figure 2A:
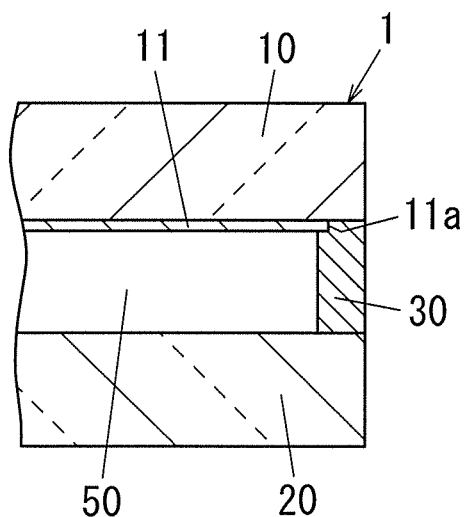
FIG. 2A is a sectional view illustrating an edge of the vacuum glass panel.
Figure 2B:
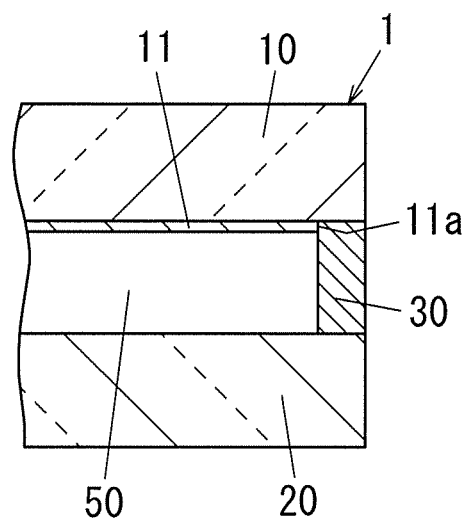
FIG. 2B is a sectional view illustrating an edge of a vacuum glass panel of a variation.
Figure 2C:
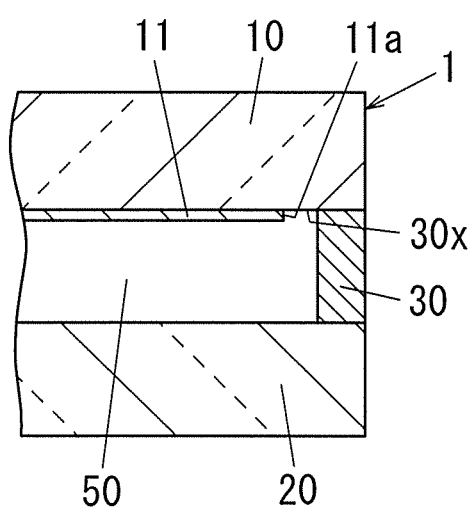
FIG. 2C is a sectional view illustrating an edge of a vacuum glass panel of a comparative example.
Figure 2D:
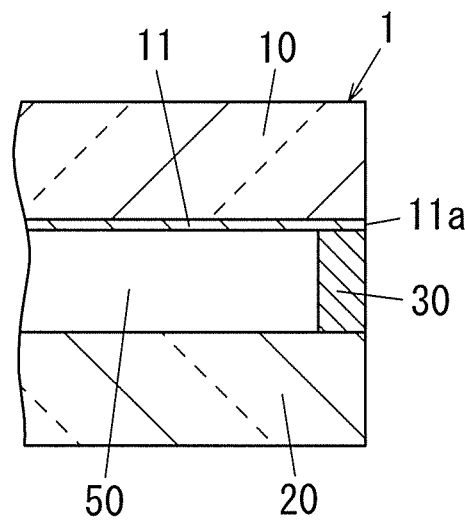
FIG. 2D is a sectional view illustrating an edge of a vacuum glass panel of another comparative example.

With reference to FIGS. 2A to 2D, the structure of the edge of the vacuum glass panel 1 will be further described. FIG. 2A is a sectional view illustrating the edge of the vacuum glass panel 1 of the first embodiment. FIG. 2B is a sectional view of a variation, and FIGS. 2C and 2D are sectional views of comparative examples.

As illustrated in FIG. 2A, in the vacuum glass panel 1 of the first embodiment, the edge 11a of the heat reflective film 11 is disposed between the first glass plate 10 and a part of an inner portion of the frame member 30. The edge 11a of the heat reflective film 11 is located between the first glass plate 10 and the part of the inner portion of the frame member 30. The heat reflective film 11 extends from the center toward the edge of the first glass plate 10 and enters between the first glass plate 10 and the frame member 30. The frame member 30 is disposed on both the heat reflective film 11 and the first glass plate 10. In other words, the frame member 30 is on the heat reflective film 11. The heat reflective film 11 separates the first glass plate 10 from the vacuum space 50 without a gap (completely). The first glass plate 10 is not exposed to the vacuum space 50. The first glass plate 10 and the vacuum space 50 are completely separated from each other by the heat reflective film 11. In the structure of FIG. 2A, the first glass plate 10 is directly in contact with the frame member 30, and therefore, the contact portion where the first glass plate 10 and the frame member 30 contact with each other has an increased adhesive strength. Moreover, since the heat reflective film 11 is disposed to face the entirety of the vacuum space 50, the thermal insulation property is improved. In the structure of FIG. 2A, an area where the frame member 30 is in contact with the first glass plate 10 is preferably larger than an area where the frame member 30 is in contact with the heat reflective film 11. Thus, the adhesive strength between the frame member 30 and the first glass plate 10 is further increased. In the sectional view of the vacuum glass panel 1, it can be said that a distance in which the frame member 30 is in contact with the first glass plate 10 is preferably longer than a distance in which the frame member 30 is in contact with the heat reflective film 11.

In the variation shown in FIG. 2B, the edge 11a of the heat reflective film 11 is in contact with a side part of the frame member 30. The frame member 30 is disposed on the first glass plate 10. Note that the frame member 30 is not on the heat reflective film 11. In this case, the heat reflective film 11 separates the first glass plate 10 from the vacuum space 50 without a gap. The first glass plate 10 is not exposed to the vacuum space 50. The first glass plate 10 and the vacuum space 50 are completely separated from each other by the heat reflective film 11. Also in the structure of FIG. 2B, the first glass plate 10 is directly in contact with the frame member 30, and therefore, the contact portion where the first glass plate 10 and the frame member 30 contact with each other has an increased adhesive strength. Moreover, since the heat reflective film 11 is disposed for the entirety of the vacuum space 50, the thermal insulation property is improved. Note that in the structure shown in FIG. 2B, the location of the edge 11a of the heat reflective film 11 has to coincide with the location of the side part of the frame member 30, and therefore, the production of the structure shown in FIG. 2B may not be easier than the production of the structure of FIG. 2A. Thus, when easiness of the production is taken into consideration, the structure of FIG. 2A is more advantageous than the structure of FIG. 2B.

In the comparative example shown in FIG. 2C, the edge 11a of the heat reflective film 11 does not reach the frame member 30 and is not in contact with the frame member 30. The heat reflective film 11 does not completely separate the first glass plate 10 from the vacuum space 50. Between the heat reflective film 11 and the frame member 30, a gap 30x is formed. At the location of the gap 30x, the first glass plate 10 faces and is exposed to the vacuum space 50. In the structure of FIG. 2C, since the first glass plate 10 is directly in contact with the frame member 30, the portion where the first glass plate 10 and the frame member 30 are in contact with each other has an increased adhesive strength. However, in the structure of FIG. 2C, the heat reflective film 11 extends only to a part of the vacuum space 50, and therefore, the gap 30x is formed. Thus, the structure of FIG. 2C has a lower thermal insulation property than each of the structures of FIGS. 2A and 2B in which the gap 30x is not formed. Thus, the structures of FIGS. 2A and 2B are more advantageous than the structure of FIG. 2C.

In the comparative example shown in FIG. 2D, the edge 11a of the heat reflective film 11 is located at the edge of the first glass plate 10 and is exposed outside. The heat reflective film 11 separates the first glass plate 10 from the frame member 30, and the first glass plate 10 is not in contact with the frame member 30. In the structure of FIG. 2D, since the heat reflective film 11 is disposed to face the entirety of the vacuum space 50, the thermal insulation property is improved. However, the first glass plate 10 is not directly in contact with the frame member 30, and therefore, the portion where the first glass plate 10 is not directly in contact with the frame member 30 has a reduced adhesive strength. Thus, the structures of FIGS. 2A and 2B are more advantageous than the structure of FIG. 2D.

As described above, when the thermal insulation property and adhesiveness are comprehensively considered, the structures of FIGS. 2A and 2B are more advantageous than the structures of FIGS. 2C and 2D. This is probably because the frame member 30 made from the glass adhesive is more easily fused at the interface to the first glass plate 10 in bonding.

The structures of the FIGS. 2A and 2B can be obtained by partially removing the heat reflective film 11 in a step of the production of the vacuum glass panel 1. When the heat reflective film 11 is not removed at all, the structure of FIG. 2D can be obtained. When the heat reflective film 11 is excessively removed, the structure of FIG. 2C can be obtained. In this regard, when the heat reflective film 11 in the location where the frame member 30 is to be provided is not removed (e.g., in the case of the structure of FIG. 2D), only a glass frit material having a high adhesiveness to the heat reflective film 11 can be used as the glass adhesive as a base of the frame member 30. Sufficiently low temperature processing of such a glass frit material is difficult, and a process with an adhesion temperature of higher than or equal to 400 degrees may be involved, which may complicate the production of the vacuum glass panel 1. On the other hand, when the heat reflective film 11 is partially removed (e.g., in the case of the structures of FIGS. 2A and 2B), the glass frit material is directly in contact with the glass plate without the heat reflective film 11 provided between the glass fit material and the glass plate, and thus, it is possible to increase the adhesiveness between the glass frit material and the glass plate. In this case, for example, low temperature processing at a temperature of about 350° C. is also possible, and it becomes possible to use low melting glass frit which is preferable as the glass frit material. As described above, in the structures of FIGS. 2A and 2B, a high adhesiveness between the first glass plate 10 and the frame member 30 can be achieved.

Moreover, when the heat reflective film 11 is partially removed (e.g., in the case of the structure of FIGS. 2A and 2B), there is a portion where the frame member 30 and the first glass plate 10 are directly bonded to each other, and therefore, even when the adhesiveness between the heat reflective film 11 and the first glass plate 10 decreases, peeling of the frame member 30 from the first glass plate 10 can be suppressed. In contrast, for example, in the structure of FIG. 2D, when the adhesiveness between the heat reflective film 11 and the first glass plate 10 decreases, the frame member 30 and the heat reflective film 11 may be peeled from the first glass plate 10. A reduction in the adhesiveness between the heat reflective film 11 and the first glass plate 10 may occur in for example, heating. Thus, for example, in the structure of FIG. 2D, heating at a high temperature is preferably avoided to suppress peeling of the heat reflective film 11. In contrast, in the case of the structures of FIGS. 2A and 2B, a process at a higher temperature is possible. Thus, according to the structures in which the heat reflective film 11 is partially removed as shown in FIGS. 2A and 2B, it is also possible to increase the adhesiveness of the frame member 30 by, for example, a process at a higher temperature in a heating process (e.g., a first heating process which will be described later) for bonding the first glass plate 10 to the second glass plate 20 with the frame member 30.

Moreover, when the heat reflective film 11 is partially removed, a large removal width of the heat reflective film 11 as in the structure of FIG. 2C may lead to formation of an area (the gap 30x of FIG. 2C) without the heat reflective film 11 in a part where the glass adhesive is not provided. Thus, this area can no longer reflect heat, which may deteriorate the thermal insulation property of the vacuum glass panel 1. In contrast, the structures of FIGS. 2A and 2B in which the heat reflective film 11 separates the first glass plate 10 from the vacuum space 50 do not have the area (the gap 30x of FIG. 2C) without the heat reflective film 11, and therefore, the thermal insulation property is improved. In this embodiment, the glass adhesive may flow in a bonding process (a step of bonding the first glass plate 10 to the second glass plate 20) and may extend beyond an original application width. Thus, the heat reflective film 11 can be removed in consideration of the application width and the extension amount of the glass adhesive. When the heat reflective film 11 is removed by a width smaller than or substantially equal to the application width of the glass adhesive, the formation of the area without the heat reflective film 11 is more reliably avoided, and the thermal insulation property can be improved.

As illustrated in FIG. 1B, the side edge surface of the first glass plate 10 may have a cut surface 10c, and the side edge surface of the second glass plate 20 may have a cut surface 20c. The cut surface 10c is a surface formed by cutting the glass plate. The cut surfaces 10c and 20c are surfaces having cut traces. As described later, the cut surface 10c and the cut surface 20c are formed when the vacuum glass panel 1 is produced by cutting a glass plate. A plurality of vacuum glass panels 1 having the cut surfaces 10c and 20c can be easily produced simultaneously and thus can be formed with high manufacturability. Moreover, the vacuum glass panel 1 does not necessarily have an exhaust port to realize a vacuum in the vacuum space 50. In the vacuum glass panel 1 having the cut surfaces 10c and 20c, it is easily eliminate the exhaust port.

In the present embodiment, of the inner surface (the first surface 10a) of the first glass plate 10 and the inner surface (the first surface 20a) of the second glass plate 20, only the inner surface of the first glass plate 10 is provided with the heat reflective film 11, but heat reflective films may be provided on the respective inner surfaces of the first glass plate 10 and the second glass plate 20. When the heat reflective films are provided on the respective inner surfaces, the thermal insulation property can further be improved. The heat reflective film (which may be referred to as a second heat reflective film) disposed on the inner surface of the second glass plate 20 may have the same configuration as the heat reflective film 11. When the second heat reflective film is provided, the frame member 30 is preferably in contact with the second glass plate 20. The edge of the second heat reflective film is preferably disposed between the second glass plate 20 and the frame member 30.

A method for producing the vacuum glass panel 1 will be described below.

FIGS. 3A to 3E and FIGS. 4A to 4D show an example method for producing the vacuum glass panel 1. FIGS. 3A to 3E are sectional views, and FIGS. 4A to 4D are plan views. Similarly to FIG. 1A, FIG. 4D shows inner members. In FIGS. 3A to 3E, the sectional views are turned upside-down from FIG. 1B. That is, in FIGS. 3A to 3E, the first glass plate 10 is disposed below the second glass plate 20.

The method for producing the vacuum glass panel 1 includes a heat reflective film removing step, an adhesive disposing step, an opposite disposition step, an evacuation step, and a bonding step. The heat reflective film removing step is a step of partially removing, from the first glass body 100 including the first glass plate 10 and the heat reflective film 11 disposed on the first surface 10a of the first glass plate 10, the heat reflective film 11 to form a portion 11x having a frame shape without the heat reflective film 11. The adhesive disposing step is a step of disposing a glass adhesive 300 at least in the portion 11x having the frame shape and formed in the first glass body 100 by removing the heat reflective film 11. The opposite disposition step is a step of disposing a second glass body 200 including the second glass plate 20 to face the first glass body 100. The evacuation step is a step of evacuating a space between the first glass body 100 and the second glass body 200. The bonding step is a step of bonding the first glass body 100 and the second glass body 200 with the glass adhesive 300 in a frame shape.

Figure 3A:
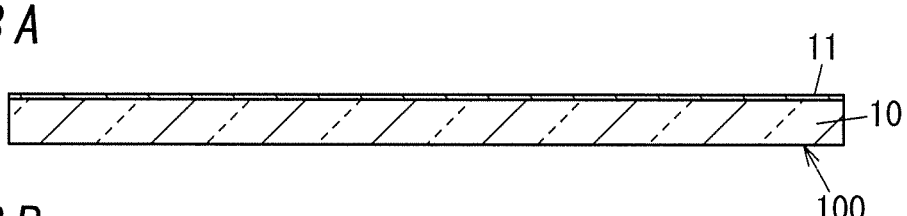
FIG. 3A is a sectional view illustrating a step in an example method for producing the vacuum glass panel.

In the course of the production of the vacuum glass panel 1, a glass composite 2 including the first glass body 100, the second glass body 200, the glass adhesive 300, and the spacers 40 is formed. FIG. 3D shows the glass composite 2.

To produce the vacuum glass panel 1, the first glass body 100 and the second glass body 200 are first prepared. FIGS. 3A and 4A show the first glass body 100 which is prepared. The first glass body 100 includes the first glass plate 10 and the heat reflective film 11 disposed on a surface of the first glass plate 10. In the heat reflective film removing step, the heat reflective film 11 is partially removed from the first glass body 100. The preparation of the first glass body 100 includes disposing the first glass body 100 on a prescribed device such that the process can proceed to a step of partially removing the heat reflective film 11. Note that the method for producing the vacuum glass panel 1 may include a step of forming the heat reflective film 11 on the first glass plate 10. Note that when a glass plate provided with the heat reflective film is available, using the glass plate provided with the heat reflective film as the first glass body 100 facilitates the production.

In FIGS. 3A and 4A, only the first glass body 100 is shown, but the second glass body 200 is also prepared separately. The preparation of the second glass body 200 includes preparing a second glass body 200 being paired with the first glass body 100 and having a prescribed dimension. The second glass body 200 includes the second glass plate 20 and may further include a second heat reflective film. FIG. 3D shows the second glass body 200 (the second glass body 200 superimposed above the first glass body 100). The second glass body 200 has an exhaust port 201. The exhaust port 201 is an outlet as a hole penetrating through the second glass body 200. The second glass body 200 has an exhaust pipe 202. The exhaust pipe 202 is disposed outside the exhaust port 201. The preparation of the second glass body 200 may include providing the exhaust port 201 and the exhaust pipe 202 in the second glass body 200.

In this embodiment, the first glass body 100 and the second glass body 200 at the time of starting the production have larger sizes than the first glass plate 10 and the second glass plate 20 which are to be finally obtained. In the method of the present embodiment, a part of the first glass body 100 and a part of the second glass body 200 are finally removed. The first glass body 100 and the second glass body 200 prepared for the production each include a portion which is to be the vacuum glass panel 1 and a portion which is to be finally removed.

Figure 3B:
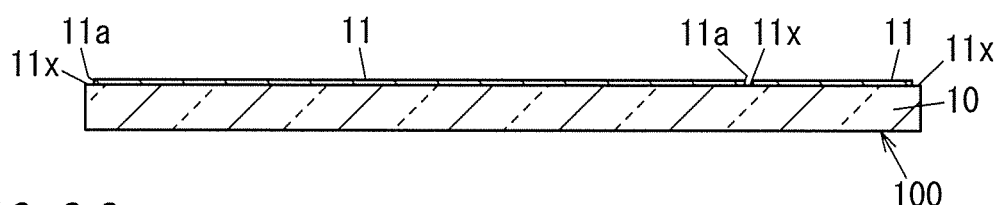
FIG. 3B is a sectional view illustrating a step following the step of FIG. 3A.

Next, as illustrated in FIGS. 3B and 4B, the heat reflective film 11 is removed from the first glass body 100 in the shape of a frame (heat reflective film removing step). In FIG. 4B, the portion 11x formed by removing the heat reflective film 11 is hatched so as to facilitate understanding. The portion 11x formed by removing the heat reflective film 11 has a shape extending linearly. A part of the heat reflective film 11 in which the glass adhesive 300 is to be disposed is removed. The portion 11x formed by removing the heat reflective film 11 may have a width smaller than or equal to the application width of the glass adhesive 300. Partially removing the heat reflective film 11 enables the frame member 30 to be directly in contact with the first glass plate 10. The heat reflective film 11 is partially removed, so that the edge 11a of the heat reflective film 11 is disposed inside the edge of a portion serving as the vacuum glass panel 1 of the first glass plate 10.

Figure 3C:
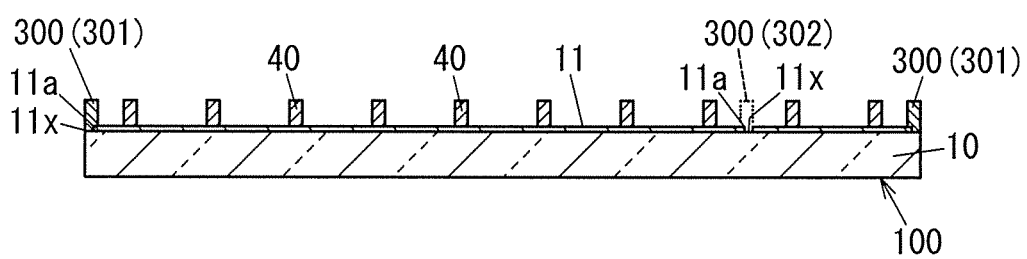
FIG. 3C is a sectional view illustrating a step following the step of FIG. 3B.
Figure 3D:
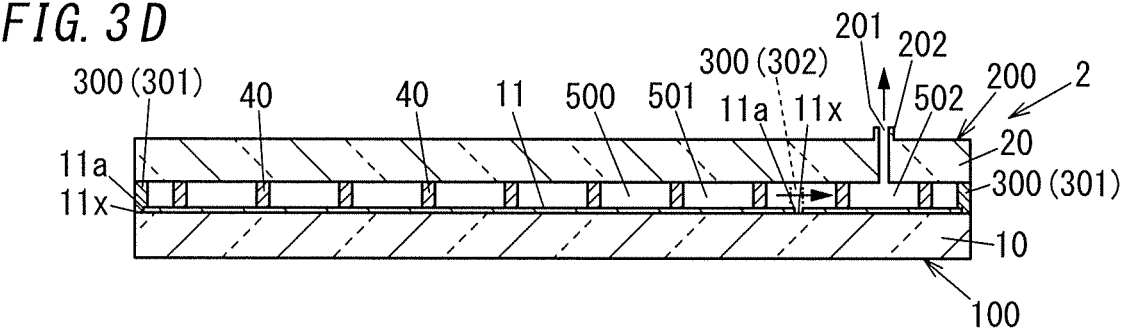
FIG. 3D is a sectional view illustrating a step following the step of FIG. 3C.

Next, as illustrated in FIGS. 3C and 4C, the glass adhesive 300 is disposed (adhesive disposing step). The spacers 40 can also be disposed in disposing the glass adhesive 300. The glass adhesive 300 includes heat-melting glass. The glass adhesive 300 is disposed in a frame form. The glass adhesive 300 finally forms the frame member 30. In this embodiment, in a portion where the glass adhesive 300 is to be disposed, the heat reflective film 11 is partially removed, and the glass adhesive 300 is disposed in the portion 11x formed by removing the heat reflective film 11 so as to be in contact with the first glass plate 10. The width of the glass adhesive 300 is preferably larger than or equal to the width of the portion 11x formed by removing the heat reflective film 11. This suppresses formation of the gap 30x (see FIG. 2C) between the heat reflective film 11 and the frame member 30, and deterioration of the thermal insulation property can be suppressed.

The glass adhesive 300 includes a plurality of glass adhesives. The plurality of glass adhesives are at least a first glass adhesive 301 and a second glass adhesive 302. The first glass adhesive 301 and the second glass adhesive 302 are disposed in respective prescribed locations. In FIG. 3C, the second glass adhesive 302 is indicated by a broken line. This means that the second glass adhesive 302 is disposed to not all portions along the short sides of the first glass body 100. From FIG. 4C, the arrangement of the first glass adhesive 301 and the second glass adhesive 302 is understood.

In the adhesive disposing step, the glass adhesive 300 is preferably disposed to be in contact with the heat reflective film 11. Thus, the edge 11a of the heat reflective film 11 is easily disposed between the first glass plate 10 and the frame member 30. At this time, the glass adhesive 300 can be in contact with the edge 11a of the heat reflective film 11. The glass adhesive 300 is more preferably on the heat reflective film 11. FIG. 3C shows that the glass adhesive 300 is in contact with the heat reflective film 11 and is further on the heat reflective film 11.

After the first glass adhesive 301 and the second glass adhesive 302 are disposed, pre-heating may be performed. The pre-heating achieves integration of the first glass adhesive 301 and integration of the second glass adhesive 302. Note that the first glass adhesive 301 is not in contact with the second glass adhesive 302. The pre-heating reduces unexpected deformation of the glass adhesive 300. The pre-heating may fix the first glass adhesive 301 and the second glass adhesive 302 to the first glass body 100. The pre-heating can be performed by heating at a temperature lower than the melting temperature of the glass adhesive 300.

The spacers 40 are preferably arranged after the glass adhesive 300 is disposed. In this case, the spacers 40 are easily arranged. The spacers 40 may be arranged at equal intervals.

Note that in FIG. 3C, the glass adhesive 300 is disposed on the first glass body 100, but the glass adhesive 300 may be disposed in an appropriate way. For example, the glass adhesive 300 may be disposed on the second glass body 200. Alternatively, after the first glass body 100 and the second glass body 200 are arranged to face each other, the glass adhesive 300 may be injected in a gap between the first glass body 100 and the second glass body 200. In this case, the glass adhesive 300 is disposed on both the first glass body 100 and the second glass body 200.

Moreover, gas adsorbent may be disposed on one or both of the first glass body 100 and the second glass body 200. The gas adsorbent may be formed by bonding a gas adsorbent material in a solid form or by applying and drying a gas adsorbent material having fluidity.

As illustrated in FIG. 4C, the first glass adhesive 301 is disposed along an outer periphery of the first glass body 100. The first glass adhesive 301 forms a single frame on the first glass body 100. The second glass adhesive 302 is disposed to correspond to the edge of the vacuum glass panel 1 which will eventually be produced. The second glass adhesive 302 is provided in an area surrounded by the first glass adhesive 301.

In FIG. 4C, two pieces of the second glass adhesive 302 are linearly aligned along one of the short sides of the vacuum glass panel 1. One piece of the second glass adhesive 302 may be provided, or three or more pieces of the second glass adhesive 302 may be provided. The pieces of the second glass adhesive 302 are arranged to form a wall. As can be seen from FIG. 4C, when the second glass body 200 is superimposed above the first glass body 100, an inner space 500 is formed between the first glass body 100 and the second glass body 200. The pieces of the second glass adhesive 302 partition the inner space 500 into two spaces. Note that a partition formed by the pieces of the second glass adhesive 302 does not completely partition the inner space 500, but the two spaces in the inner space 500 are in communication with each other. The two spaces in the inner space 500 are a first space 501 which is away from the exhaust port 201 and a second space 502 which is adjacent to the exhaust port 201. The first space 501 and the second space 502 are separated by the pieces of the second glass adhesive 302. The second space 502 is in communication with the exhaust port 201 of the second glass body 200 (see FIG. 3D). The first space 501 is not directly in communication with the exhaust port 201. In the present method, since each piece of the second glass adhesive 302 is away from the first glass adhesive 301 and the two pieces of the second glass adhesive 302 are away from each other, and therefore, the first space 501 and the second space 502 are in communication with each other. A gap between the first glass adhesive 301 and each piece of the second glass adhesive 302 and a gap between the two pieces of the second glass adhesive 302 function as air passages for the evacuation. In the evacuation step, air in the first space 501 is exhausted through the air passages.

Next, as illustrated in FIG. 3D, the second glass body 200 is disposed on the glass adhesive 300 to face the first glass body 100 (opposite disposition step). In this way, the glass composite 2 including the first glass body 100, the second glass body 200, the glass adhesive 300, and the spacers 40 is formed. The glass composite 2 has the inner space 500 between the first glass body 100 and the second glass body 200. As described with reference to FIG. 4C, the inner space 500 is partitioned. In FIG. 3D, the second glass adhesive 302 is shown by a broken line. The second glass adhesive 302 does not completely partition the inner space 500.

Then, the glass composite 2 is heated. The glass composite 2 may be heated in a furnace. By heating the glass composite 2, the temperature of the glass composite 2 increases. When the glass adhesive 300 reaches the hot-melt temperature, glass melts, and the glass adhesive 300 develops adhesiveness. The melting temperature of the glass adhesive 300 is, for example, higher than 300° C. The melting temperature of the glass adhesive 300 may be higher than 400° C. Note that a lower melting temperature of the glass adhesive is advantageous as a process. Thus, the melting temperature of the glass adhesive 300 is preferably lower than or equal to 400° C. and more preferably lower than or equal to 360° C. The hot-melt temperature of the first glass adhesive 301 is preferably different from the hot-melt temperature of the second glass adhesive 302.

The heating is performed in two or more steps. For example, the temperature is increased to a prescribed temperature, and the heating is performed with this temperature being maintained, and then, the temperature is further increased to a prescribed temperature, and the heating is performed. The first step of the heating is defined as a first heating process. The second step of the heating is defined as the second heating process.

In this method, the first glass adhesive 301 melts at a temperature lower than a temperature at which the second glass adhesive 302 melts. That is, the first glass adhesive 301 melts earlier than the second glass adhesive 302. In the first heating process, the first glass adhesive 301 melts, and the second glass adhesive 302 does not melt. When the first glass adhesive 301 melts, the first glass adhesive 301 bonds the first glass body 100 to the second glass body 200, thereby hermetically sealing the inner space 500. A temperature at which the first glass adhesive 301 melts but the second glass adhesive 302 does not melt is defined as a first melting temperature. At the first melting temperature, the second glass adhesive 302 does not melt, and therefore, the pieces of the second glass adhesive 302 maintain their shape.

After the temperature reaches the first melting temperature, evacuation is started to exhaust gas in the inner space 500 (evacuation step). The evacuation may be performed after the temperature is lowered to a temperature (evacuation start temperature) lower than the first melting temperature. Note that as long as the glass composite 2 is not deformed, the evacuation may be started before the temperature reaches the first melting temperature.

The evacuation may be performed by a vacuum pump connected to the exhaust port 201. A pipe extending from the vacuum pump is connected to the exhaust pipe 202. Through the evacuation, the pressure of the inner space 500 is reduced, and the inner space 500 transitions to a vacuum state. Note that the evacuation of the present method is an example, and other methods of evacuation may be adopted. For example, the entirety of the glass composite 2 is placed in a vacuum chamber and may be subjected to the evacuation.

In FIG. 3D, exhaustion of the gas from the inner space 500 is indicated by the upward arrow. Moreover, a flow of air moving from the first space 501 to the second space 502 is indicated by the rightward arrow. As described above, the pieces of the second glass adhesive 302 are arranged to form the air passages, the air passes through the air passages and is exhausted through the exhaust port 201. Thus, a vacuum is realized in the inner space 500 including the first space 501 and the second space 502.

After the prescribed degree of vacuum is realized in the inner space 500, the heating temperature for the glass composite 2 is increased (the second heating process). The heating temperature is increased while the evacuation continues. The heating temperature is increased so that the temperature reaches a second melting temperature higher than the first melting temperature. The second melting temperature is higher than the first melting temperature by, for example, 10° C. to 100° C.

Melting of the glass adhesive 300 may mean that the hot-melt glass becomes soft due to heat to such an extent that the hot-melt glass can deform or perform bonding. Meltability does not have to be exhibited to such an extent that the glass adhesive 300 flows.

At the second melting temperature, the second glass adhesive 302 melts. The melted second glass adhesive 302 bonds the first glass body 100 to the second glass body 200 at the location of the second glass adhesive 302. Moreover, the second glass adhesive 302 becomes soft due to its meltability. The pieces of the second glass adhesive 302 which become soft deform and close the air passages. In the present method, the gap (air passage) formed between the first glass adhesive 301 and each second glass adhesive 302 is closed. Moreover, the gap (air passage) formed between the two pieces of the second glass adhesive 302 is closed. Note that each second glass adhesive 302 has both ends each having a closing part 302*a* so as to easily close the air passage (FIG. 4C). The closing part 302*a* is a part in which a larger amount of the second glass adhesive 302 is provided than in other parts. The closing parts 302*a* extends from the ends of the second glass adhesive 302 in a direction along the long sides of the vacuum glass panel 1. The closing parts 302*a* deform and close the air passages. Note that the bonding step is performed during the first heating process and the second heating process. In the present method, the evacuation process progresses in the course of the bonding step.

Figure 3E:
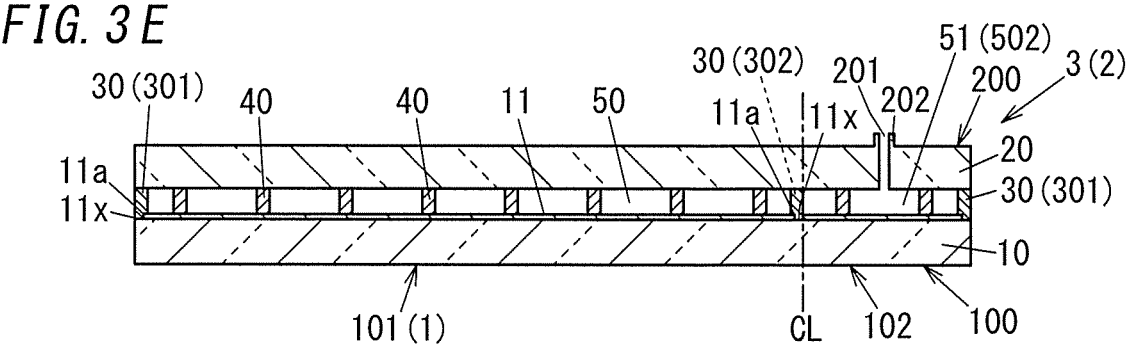
FIG. 3E is a sectional view illustrating a step following the step of FIG. 3D.

FIGS. 3E and 4D show the glass composite 2 after the air passages are closed. The glass composite 2 becomes integrated due to the adhesive action of the glass adhesive 300. The integrated glass composite 2 is a panel as an intermediate product (defined as an integrated panel 3).

The vacuum space 50 is formed by dividing the inner space 500 into the vacuum space 50 away from the exhaust port 201 and an evacuation space 51 adjacent to the exhaust port 201. The pieces of the second glass adhesive 302 deform to form the vacuum space 50. The vacuum space 50 is formed from the first space 501. The evacuation space 51 is formed from the second space 502. The vacuum space 50 is not in communication with the evacuation space 51. The vacuum space 50 is hermetically sealed with the first glass adhesive 301 and the second glass adhesive 302.

In the integrated panel 3, the first glass adhesive 301 and the pieces of the second glass adhesive 302 are integrated to form the frame member 30. The frame member 30 surrounds the vacuum space 50. The frame member 30 also surrounds the evacuation space 51. The first glass adhesive 301 is a part of the frame member 30, and the second glass adhesive 302 is the other part of the frame member 30.

After the vacuum space 50 is formed, the integrated panel 3 is cooled. Moreover, after the vacuum space 50 is formed, the evacuation ends. Since the vacuum space 50 is hermetically sealed, the vacuum is maintained also after the evacuation ends. Note that for safety, the evacuation is stopped after the integrated panel 3 is cooled. When the evacuation ends, the pressure of the evacuation space 51 may return to an atmospheric pressure.

Finally, the integrated panel 3 is cut. The integrated panel 3 includes a portion (defined as a glass panel portion 101) which will be the vacuum glass panel 1 and an unnecessary portion (defined as an unnecessary portion 102). The glass panel portion 101 includes the vacuum space 50. The unnecessary portion 102 includes the exhaust port 201.

In FIGS. 3E and 4D, a cutting location of the integrated panel 3 is indicated by a broken line (cutting line CL). The integrated panel 3 is cut, for example, along an outer periphery of the frame member 30 of the portion which will be the vacuum glass panel 1. The integrated panel 3 is cut at a location where the vacuum space 50 is not broken.

The unnecessary portion 102 is removed by cutting the integrated panel 3, so that the glass panel portion 101 is taken out. From the glass panel portion 101, the vacuum glass panel 1 as shown in FIGS. 1A and 1B is obtained. As illustrated in FIG. 1B, cutting the first glass body 100 and the second glass body 200 form the cut surfaces 10*c* and 20*c* of the vacuum glass panel 1.

As described above, the production of the vacuum glass panel 1 preferably further includes a cutting step of cutting the first glass body 100 and the second glass body 200 after the bonding step. The vacuum glass panel 1 having no exhaust port can be easily obtained by cutting the glass body.

Figure 5A:
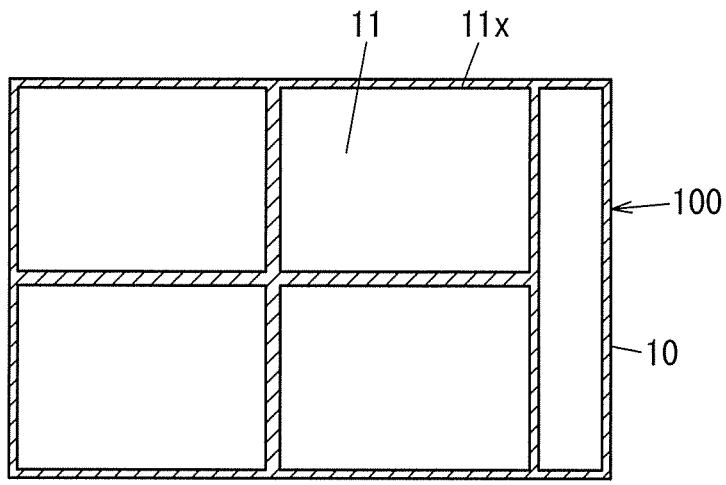
FIG. 5A is a plan view illustrating a step in another example method for producing the vacuum glass panel.
Figure 5B:
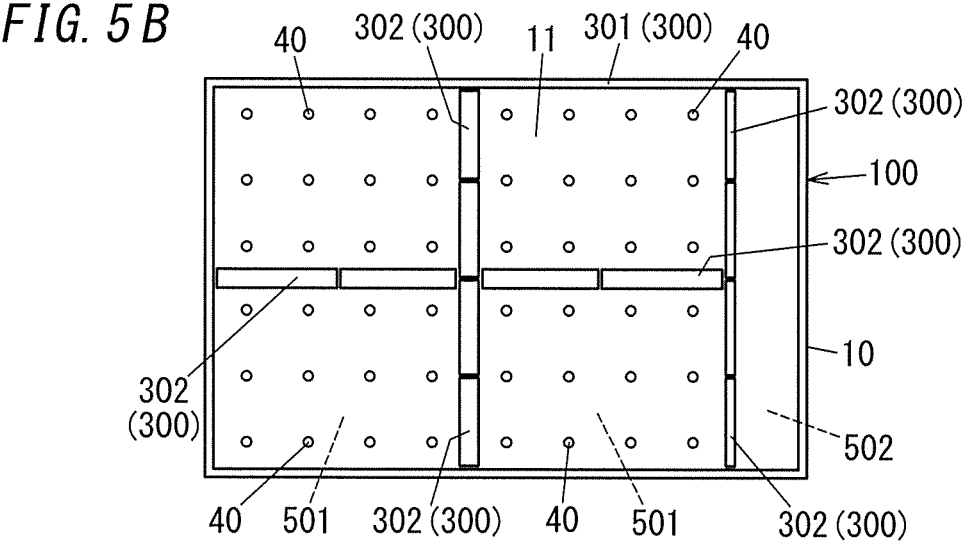
FIG. 5B is a plan view illustrating a step following the step of FIG. 5A.
Figure 5C:
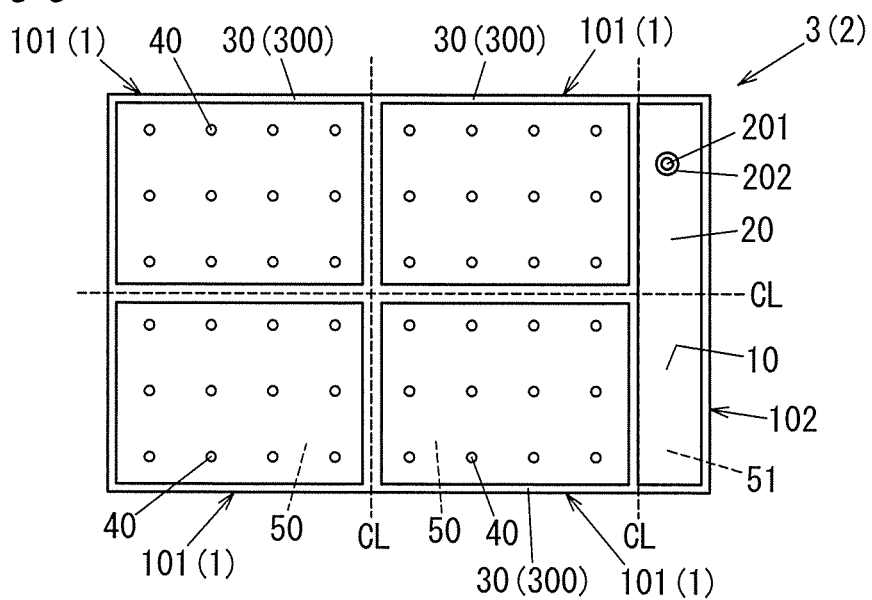
FIG. 5C is a plan view illustrating a step following the step of FIG. 5B.

FIGS. 5A to 5C show another method for producing the vacuum glass panel. FIGS. 5A to 5C are plan views. In FIGS. 5A to 5C, components described above are denoted by the same reference signs as those in the above description, and the description thereof is omitted.

This method simultaneously produces a plurality of vacuum glass panels 1. This method employs two large-area glass bodies, and the glass bodies are cut, thereby forming the plurality of vacuum glass panels 1. Such a method is referred to as multiple production.

The method shown in FIGS. 5A to 5C also produces the vacuum glass panels 1 by a heat reflective film removing step, an adhesive disposing step, an opposite disposition step, an evacuation step, a bonding step, and a cutting step which are similar to those described above. That is, as illustrated in FIG. 5A, in a manner similar to that shown in FIG. 4B, a portion (a portion where a frame member 30 is to be disposed) of a heat reflective film 11 is removed. Here, in the case of the multiple production as in the present method, the heat reflective film 11 is partially removed from a portion around the center of a first glass body 100. Next, as illustrated in FIG. 5B, in a manner similar to that shown in FIG. 4C, a glass adhesive 300 and spacers 40 are disposed. Then, as illustrated in FIG. 5C, in a manner similar to that shown in FIG. 4D, heating and evacuation are performed to bond the first glass body 100 to a second glass body 200 and to form a vacuum space 50 between the first glass body 100 and the second glass body 200. Finally, along a cutting line CL, an integrated panel 3 is cut, thereby obtaining the vacuum glass panels 1.

Here, as illustrated in FIG. 5C, in the present method, two or more (in the present embodiment, four) vacuum glass panels 1 can be obtained from one integrated panel 3 (a glass composite 2). Thus, as illustrated in FIG. 5B, the glass adhesive 300 is disposed at an edge of each vacuum glass panel 1. In the method described in FIGS. 5A to 5C, the cutting step includes removing an unnecessary portion 102 and individualizing the vacuum glass panels 1. When the vacuum glass panels 1 are produced by the multiple production, the vacuum glass panels 1 can be efficiently produced with high productivity. In each vacuum glass panel 1 obtained, the frame member 30 is directly in contact with a glass plate (a first glass plate 10), the bonding strength of glass is high.

Figure 6:
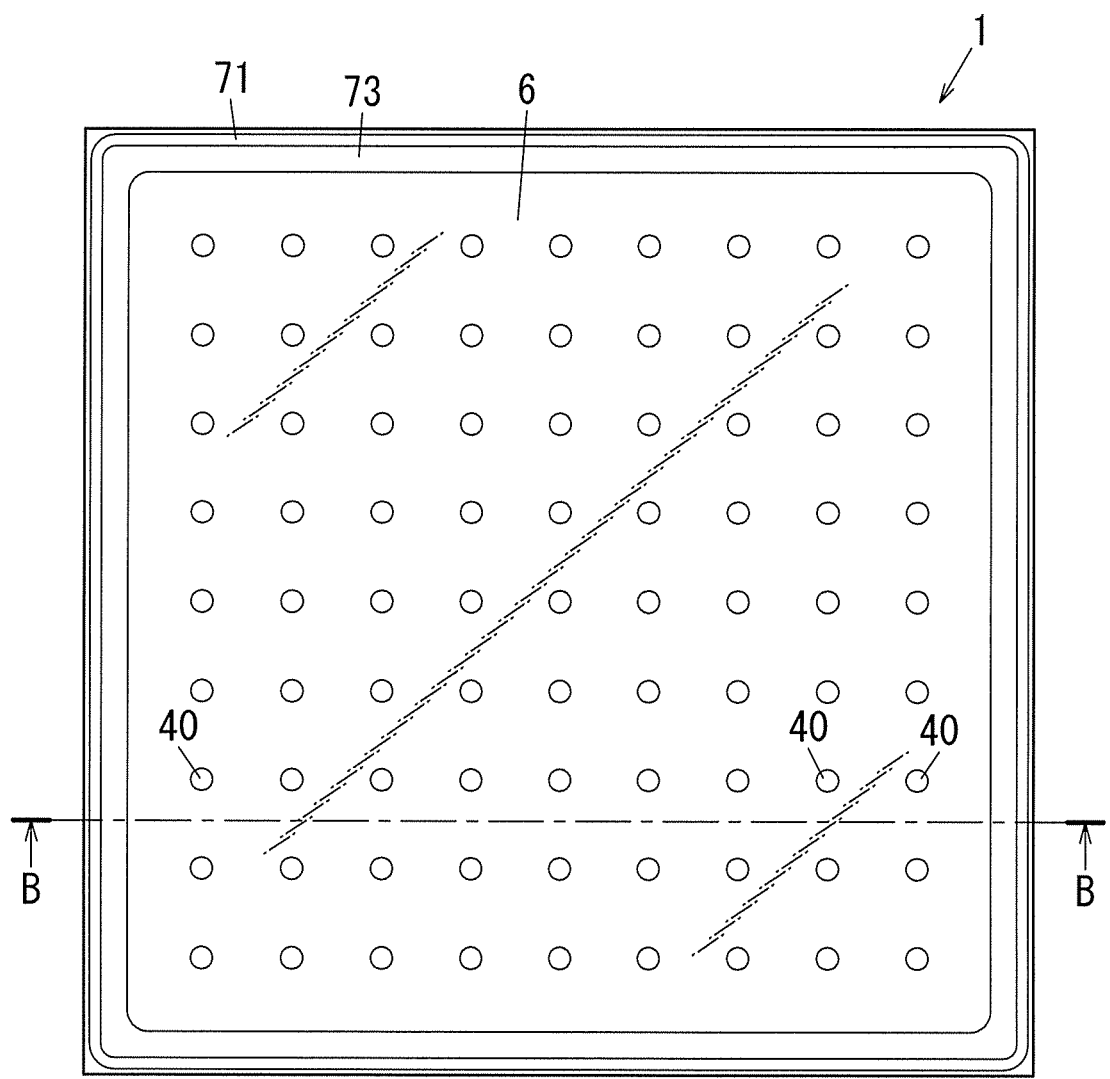
FIG. 6 is a plan view illustrating a vacuum glass panel of a second embodiment.

Next, a vacuum glass panel 1 of a second embodiment and a method for producing the vacuum glass panel 1 will be described with reference to FIGS. 6 and 7. In the following description, components similar to those in the first embodiment are denoted by the same reference signs as those in the first embodiment, and the detailed description thereof will be omitted.

The vacuum glass panel 1 of the second embodiment further includes a third glass plate 6 located to face a first glass plate 10 and a second frame member 71 entirely bonding a frame-shaped peripheral portion of the first glass plate 10 to a frame-shaped peripheral portion of the third glass plate 6. Between the first glass plate 10 and the third glass plate 6, an inner space 72 which is hermetically sealed is provided. Note that the third glass plate 6 is only required to be located to face one of the first glass plate 10 and a second glass plate 20. When the third glass plate 6 is located to face the second glass plate 20, the second frame member 71 entirely bonds a frame-shaped peripheral portion of the second glass plate 20 to the frame-shaped peripheral portion of the third glass plate 6, and the inner space 72 which is hermetically sealed is provided between the second glass plate 20 and the third glass plate 6.

Figure 7:
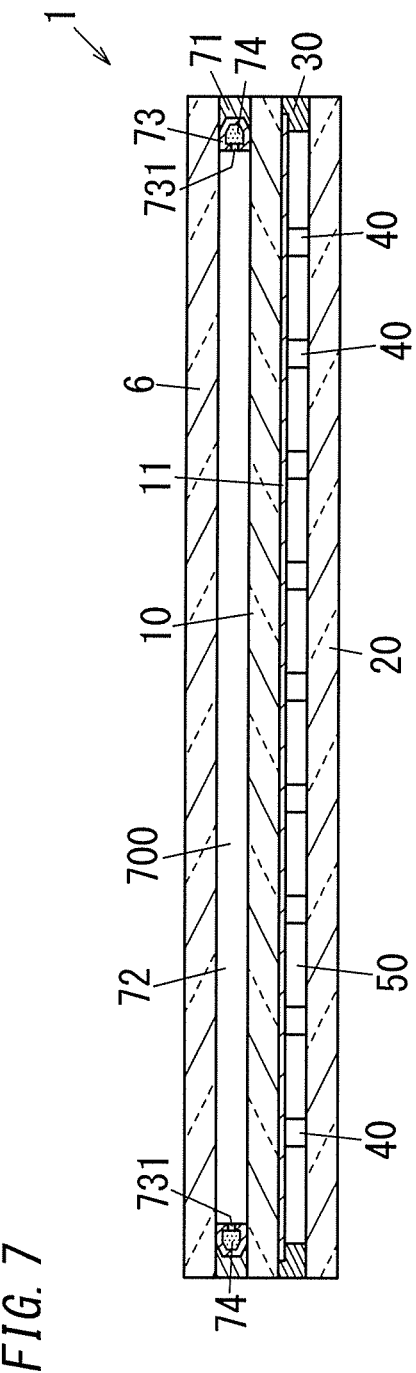
FIG. 7 is a sectional view taken along line B-B of FIG. 6.

As illustrated in FIG. 7, inside the second frame member 71, a spacer 73 having a hollow and a frame shape is disposed. In the hollow of the spacer 73 is filled with desiccant 74.

The spacer 73 is made of metal such as aluminum and has an through hole 731 on an inner circumferential side of the spacer 73. The hollow of the spacer 73 is in communication with the inner space 72 via the through hole 731. The desiccant 74 is, for example, silica gel. The second frame member 71 is made of a highly hermetic resin, for example, a silicon resin, butyl rubber, or the like.

The inner space 72 is a space hermetically sealed with the first glass plate 10 (or the second glass plate 20), the third glass plate 6, and the second frame member 71. The inner space 72 is filled with drying gas 700. The drying gas 700 is, for example, dried noble gas such as argon or dry air. The dry air includes air dried due to the action of the desiccant 74 after the air is sealed in the inner space 72.

The vacuum glass panel 1 of the second embodiment has a vacuum space 50 with a pressure reduced to a prescribed degree of vacuum and the inner space 72 filled with the drying gas 700 between the third glass plate 6 and the second glass plate 20 (or the first glass plate 10) which are located on opposing sides in the thickness direction of the vacuum glass panel 1, and therefore, the vacuum glass panel 1 has a further improved thermal insulation property.

Next, a glass window 7 including the vacuum glass panel 1 of the first embodiment or the second embodiment will be described.

Figure 8:
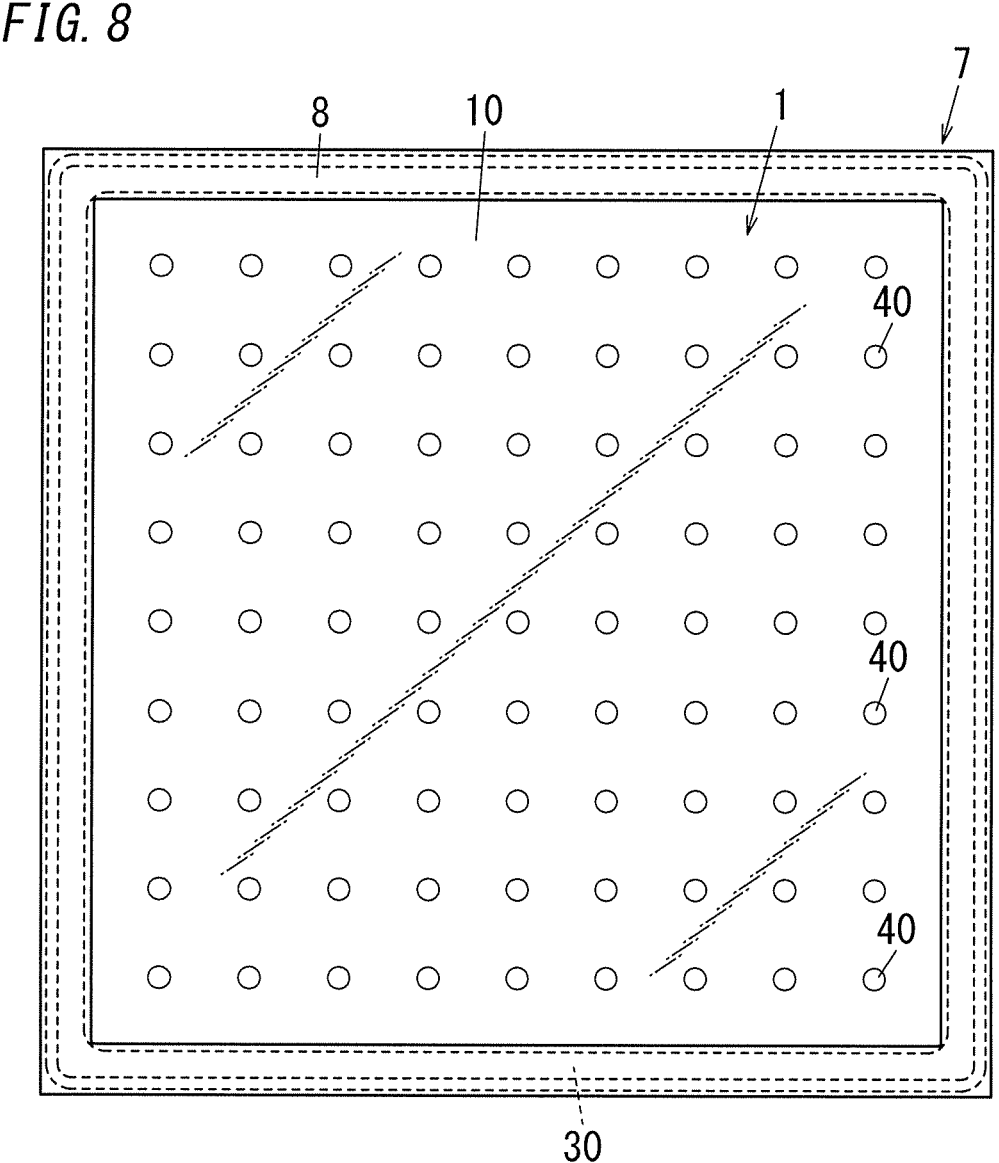
FIG. 8 is a plan view of a glass window including the vacuum glass panel of the first embodiment.

FIG. 8 shows the glass window 7 including the vacuum glass panel 1 of the first embodiment. The glass window 7 has a structure in which a window frame 8 having a rectangular frame shape is fitted to a peripheral portion of the vacuum glass panel 1 of the first embodiment, and the glass window 7 has an improved thermal insulation property.

The window frame 8 can also be fitted to a vacuum glass panel 1 of the second embodiment. In this case, a glass window 7 having an improved thermal insulation property can be obtained.

As can be seen from each embodiment described above, a vacuum glass panel (1) according to an aspect includes a first glass plate (10), a second glass plate (20) facing the first glass plate (10), a frame member (30) having a frame shape and bonding the first glass plate (10) to the second glass plate (20), and a heat reflective film (11) disposed on an inner surface of the first glass plate (10). A vacuum space (50) is provided between the first glass plate (10) and the second glass plate (20). The heat reflective film (11) separates the first glass plate (10) from the vacuum space (50) without a gap. The frame member (30) is in contact with the first glass plate (10).

The vacuum glass panel (1) according to the aspect may further include the following configurations. That is, in the vacuum glass panel (1) according to the aspect, the first glass plate (10) has a side edge surface including a cut surface (10c), and the second glass plate (20) has a side edge surface including a cut surface (20c).

The vacuum glass panel (1) according to the aspect may further include the following configurations. That is, in the vacuum glass panel (1) according to the aspect, the heat reflective film (11) has an edge (11a) between the first glass plate (10) and the frame member (30).

The vacuum glass panel (1) according to the aspect may further include the following configurations. That is, the vacuum glass panel (1) according to the aspect further includes a third glass plate (6) facing one glass plate of the first glass plate (10) and the second glass plate (20) and a second frame member (71) having a frame shape and bonding the one glass plate to the third glass plate (6), wherein an inner space (72) between the one glass plate and the third glass plate (6) is filled with drying gas (700).

A glass window (7) of an aspect includes the vacuum glass panel (1) of the aspect and a window frame (8) fitted to a peripheral portion of the vacuum glass panel (1).

A method for producing a vacuum glass panel according to an aspect includes removing, from a first glass body (100) including a first glass plate (10) and a heat reflective film (11) disposed on a first surface (10a) of the first glass plate (10), part of the heat reflective film (11) to form a portion having a frame shape without the heat reflective film (11); disposing a glass adhesive (300) at least in the portion having the frame shape and formed in the first glass body (100) by partially removing the heat reflective film (11); disposing a second glass body (200) including a second glass plate (20) to face the first glass body (100); evacuating a space between the first glass body (100) and the second glass body (200); and bonding the first glass body (100) and the second glass body (200) with the glass adhesive (300) in a frame shape.

The method according to the aspect may further include the following configuration. That is, the method according to the aspect further includes cutting the first glass body (100) and the second glass body (200) after the bonding.

The method according to the aspect may further include the following configuration. That is, in the method according to the aspect, in the disposing of the glass adhesive, the glass adhesive (300) is disposed to be in contact with the heat reflective film (11).

REFERENCE SIGNS LIST

1 Vacuum Glass Panel
6 Third Glass Plate
7 Glass Window
8 Window Frame
10 First Glass Plate
10a First Surface
10c Cut Surface
11 Heat reflective film
11a Edge
20 Second Glass Plate
20c Cut Surface
100 First Glass Body
200 Second Glass Body
30 Frame Member
50 Vacuum Space
71 Second Frame Member
72 Inner Space
300 Glass Adhesive
700 Drying Gas

The invention claimed is:

1. A method for producing a vacuum glass panel, the method comprising:
   removing, from a first glass body including a first glass plate and a heat reflective film disposed on a first surface of the first glass plate, part of the heat reflective film to form a portion having a frame shape without the heat reflective film;
   removing the heat reflective film partially from a portion around the center of the first glass body,
   disposing a first glass adhesive in the portion having the frame shape and formed in the first glass body by partially removing the heat reflective film;
   disposing a second glass adhesive in the portion formed around the center of the first glass body by partially removing the heat reflective film;
   disposing a second glass body including a second glass plate to face the first glass body;
   evacuating a space between the first glass body and the second glass body;
   bonding the first glass body and the second glass body with the first glass adhesive and the second glass adhesive to form an integrated panel including a vacuum space; and
   cutting the integrated panel at a location where the vacuum space is not broken to obtain two or more vacuum glass panels.

2. The method according to claim 1, wherein the first glass adhesive and the second glass adhesive are in contact with the heat reflective film.

3. The method according to claim 1, wherein the first glass adhesive melts at a lower temperature than the second glass adhesive.

4. The method according to claim 3, wherein when disposing the second glass adhesive in the portion formed around the center of a first glass body by partially removing the heat reflective film the second glass adhesive does not contact the first glass adhesive.

5. The method according to claim 4, wherein the first glass adhesive surrounds the second glass adhesive when viewed in plan.

* * * * *